United States Patent
Olgaard et al.

(10) Patent No.: US 8,166,340 B2
(45) Date of Patent: Apr. 24, 2012

(54) APPARATUS AND METHOD FOR TESTING A COMMUNICATION CIRCUIT

(75) Inventors: Christian Volf Olgaard, Sunnyvale, CA (US); Peter Petersen, Brentwood, CA (US); Kevan Smith, Menlo Park, CA (US)

(73) Assignee: Litepoint Corporation, Sunnyvale, CA (US)

( * ) Notice: Subject to any disclaimer, the term of this patent is extended or adjusted under 35 U.S.C. 154(b) by 488 days.

(21) Appl. No.: 12/144,919

(22) Filed: Jun. 24, 2008

(65) Prior Publication Data

US 2009/0319826 A1    Dec. 24, 2009

(51) Int. Cl.
    G06F 11/00    (2006.01)
(52) U.S. Cl. ............................ 714/12; 714/708; 714/712
(58) Field of Classification Search .................... 714/12, 714/707, 708, 712; 370/241, 350; 455/67.11
    See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,138,608 A | 8/1992 | Kucera et al. | |
| 5,467,341 A * | 11/1995 | Matsukane et al. | 370/253 |
| 5,815,508 A * | 9/1998 | Wadzinske et al. | 714/704 |
| 5,910,977 A | 6/1999 | Torregrossa | |
| 6,021,515 A | 2/2000 | Shimura | |
| 6,310,911 B1 * | 10/2001 | Burke et al. | 375/224 |
| 6,453,151 B1 * | 9/2002 | Kiang et al. | 455/67.11 |
| 6,745,353 B2 * | 6/2004 | Susnow et al. | 714/706 |
| 6,753,693 B2 | 6/2004 | Seo et al. | |
| 6,757,855 B1 * | 6/2004 | Rusk et al. | 714/724 |
| 6,870,392 B2 | 3/2005 | Kilian et al. | |
| 6,986,086 B2 | 1/2006 | Scholten | |
| 7,057,518 B2 | 6/2006 | Schmidt | |
| 7,463,140 B2 | 12/2008 | Schmidt | |
| 7,549,092 B2 * | 6/2009 | Jang | 714/700 |
| 7,564,893 B2 | 7/2009 | O'Neill | |
| 7,567,521 B2 * | 7/2009 | Olgaard et al. | 370/252 |
| 7,584,384 B2 * | 9/2009 | Russell | 714/36 |
| 7,865,147 B2 * | 1/2011 | Olgaard et al. | 455/67.14 |
| 7,890,062 B2 * | 2/2011 | Toong et al. | 455/67.15 |
| 7,890,822 B2 | 2/2011 | Behziz et al. | |
| 7,953,389 B2 * | 5/2011 | Coleman et al. | 455/410 |
| 7,970,428 B2 * | 6/2011 | Lin et al. | 455/522 |
| 2003/0064745 A1 * | 4/2003 | Benveniste | 455/522 |
| 2004/0180686 A1 * | 9/2004 | Nakayama | 455/522 |
| 2004/0218539 A1 * | 11/2004 | Anqud et al. | 370/241 |
| 2004/0233837 A1 | 11/2004 | Ray | |
| 2005/0245194 A1 * | 11/2005 | Hayes et al. | 455/63.1 |
| 2007/0189174 A1 * | 8/2007 | Hibbert | 370/241 |
| 2010/0002588 A1 * | 1/2010 | Cantwell et al. | 370/241 |
| 2010/0197340 A1 * | 8/2010 | Lin et al. | 455/522 |
| 2010/0273433 A1 * | 10/2010 | Ozaki et al. | 455/67.11 |

OTHER PUBLICATIONS

International Search Report corresponding to International Application No. PCT/US2009/045454, Korean Intellectual Property Office, dated Jan. 13, 2010, 3 pgs.
Written Opinion corresponding to International Application No. PCT/US2009/045454, Korean Intellectual Property Office, dated Jan. 13, 2010, 3 pgs.

(Continued)

Primary Examiner — Marc Duncan

(57) ABSTRACT

An apparatus for testing a communication circuit includes a detection module and a capture module. The detection module provides an enable signal in response to receiving at least one predetermined plurality of data from a communication device under test. The capture module captures at least one other predetermined plurality of data in response to the enable signal.

18 Claims, 4 Drawing Sheets

OTHER PUBLICATIONS

International Preliminary Report on Patentability for PCT Application No. PCT/US2009/045454, 1 page.
Written Opinion of the International Searching Authority for PCT Application No. PCT/US2009/045454, 3 pages.
Official Action 77034 from the Instituto Mexicano de la Propiedad Industrial corresponding to Mexican Patent Application MX/a/2010/012621, dated Sep. 23, 2011, 3 pages (Espanol and English translated).

* cited by examiner

APPARATUS AND METHOD FOR TESTING A COMMUNICATION CIRCUIT

BACKGROUND

1. Field of the Invention

The present disclosure relates to wireless communication systems, and more particularly to production testing of wireless communication systems.

2. Related Art

When communication circuits, such as wireless transmitters, are initially powered up, packets that are initially transmitted can have varying power levels and/or carrier frequencies. Therefore, when testing communication circuits it is desirable for the communication circuit to stabilize in order to get an accurate and stable measurement. For example, if a testing system measures a first packet transmitted by the communication circuit after powering up, the measurement may not be representative of the communication circuit during typical use.

As such, prior art testing systems introduce a time delay after powering up the communication circuit. After the time delay, the communication circuit has stabilized and the testing system can begin taking measurements of packets transmitted by the communication circuit. The time delay must be long enough to ensure that the communication circuit has reached stable operation. However, the time delay may not be constant for every communication circuit due to factors such as heat, control algorithm variations, absolute phase variations, settling time variations, and other known factors. In addition, the testing system may perform other tasks in parallel, which can cause the time delay to vary.

In some communication circuits, such as WiMAX circuits for example, testing typically starts after the circuit has synchronized with the testing system. In these communication circuits, the testing system polls the communication circuit to determine whether it has synchronized. After synchronization, the testing system can introduce a time delay before measuring test packets transmitted from the communication circuit.

Because the time delay required for the communication circuit can vary, many prior art testing systems are designed for a worst case time delay for the communication circuit to stabilize. As such, prior art testing systems waste time waiting for the worst case time delay to expire even if the communication circuit has already stabilized. Therefore, is it desirable, among other things, provide an apparatus and method to test communication circuit in a more time-efficient manner.

SUMMARY

In one example, an apparatus for testing a communication circuit includes a detection module and a capture module. The detection module provides an enable signal in response to receiving at least one predetermined plurality of data from a communication device under test. The predetermined plurality of data can be one or more packets of information or one or more time based frames of information. The capture module captures at least one other predetermined plurality of data in response to the enable signal. In another example, the detection module provides the enable signal in response to detecting a predetermined number of predetermined plurality of data. A method is also disclosed.

The apparatus and method provide, among other advantages, a reduced testing time due to the capture module capturing predetermined plurality of data without having to wait for a predetermined time delay. The reduced testing time also can reduce production costs of communication circuits. In addition, testing of the communication circuit starts when the detection module receives the predetermined number of predetermined plurality of data from the communication circuit. Therefore, the apparatus does not need to issue additional commands to start the testing, which further reduces testing time. Other advantages will be recognized by those of ordinary skill in the art.

In another example, the apparatus includes a measurement module. The measurement module measures a power and/or data rate of the at least one other predetermined plurality of data. In another example, the apparatus includes a storage module. The storage module stores the at least one other predetermined plurality of data. In another example, the storage module stores measurement information received from the measurement module.

In another example, the detection module includes a counting module. The counting module increments and/or decrements a count in response to each of the at least one predetermined plurality of data received. In another example, the detection module includes a comparison module. The comparison module provides the enable signal in response to the count transcending the predetermined number.

In another example, the apparatus includes a generation module. The generation module transmits a first predetermined plurality of data. The at least one predetermined plurality of data is received in response to transmitting the first predetermined plurality of data. In another example, a remote communication circuit is deemed synchronized when the at least one other predetermined plurality of data is received.

In another example, the apparatus includes a switch module. The switch module selectively communicates the at least one predetermined plurality of data to the detection module, the at least one other predetermined plurality of data to the capture module, and/or the first predetermined plurality of data from the generation module.

DETAILED DESCRIPTION

Figure 1:
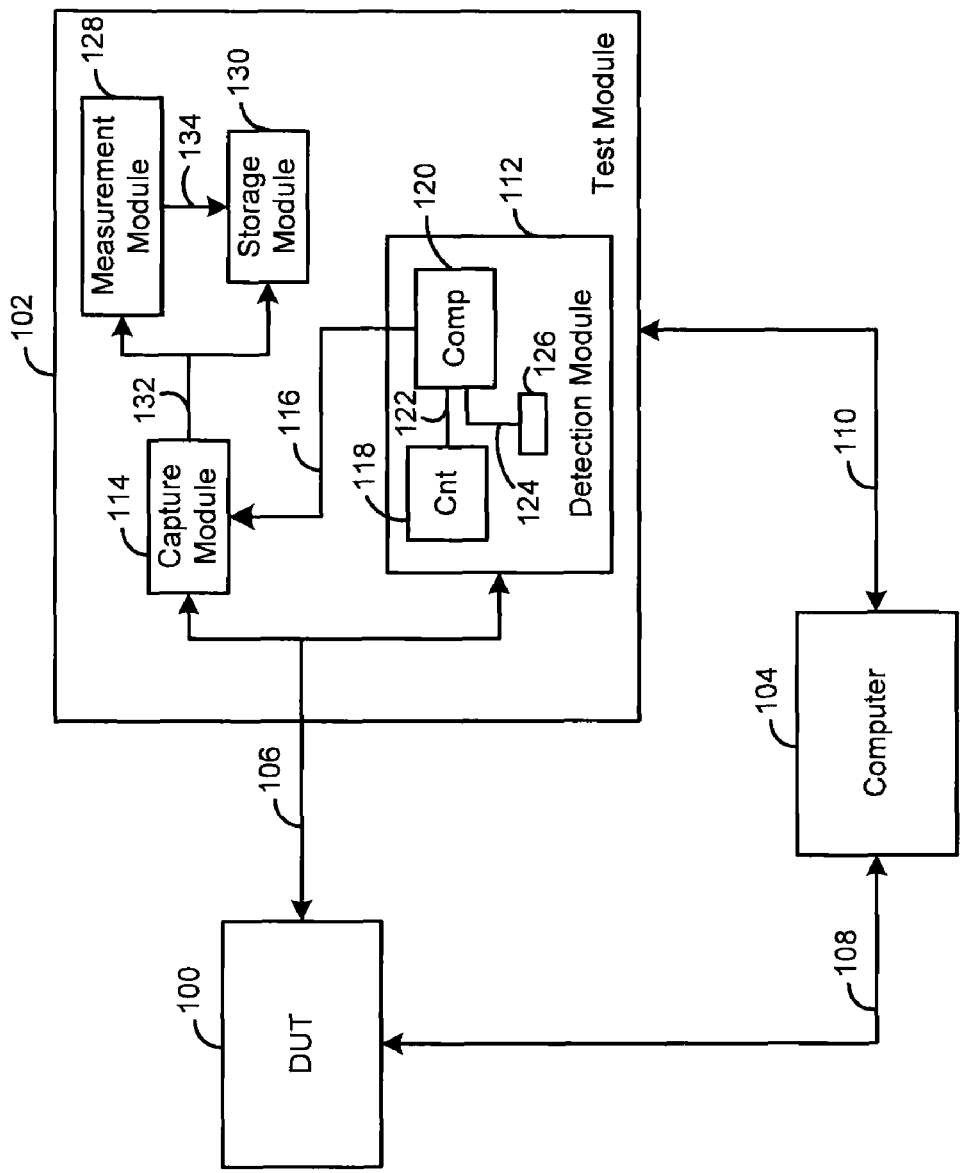
FIG. 1 is an exemplary functional block diagram of a test setup that includes a device under test, a test module, and a computer.

The following description of the embodiments is merely exemplary in nature and is in no way intended to limit the invention, its application, or uses. For purposes of clarity, the same reference numbers will be used in the drawings to identify similar elements. The embodiments are described in sufficient detail to enable one of ordinary skill in the art to practice the disclosure, and it will be understood that other embodiments may be practiced with some variations without departing from the spirit or scope of the subject invention.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described functionality. Additionally, the term "signal" may refer to one or more currents, one or more voltages, or a data signal. Further, while the present disclosure has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Referring now to FIG. 1, a test setup includes a device under test (DUT) 100 (e.g., a communication circuit), a test module 102, and a computer 104. The DUT 100 is operatively coupled to the test module 102 and the computer 104 via interfaces 106 and 108, respectively. The test module 102 and the computer 104 are operatively coupled via interface 110.

The test module 102 includes a detection module 112 and a capture module 114. When the DUT 100 is powered up and/or initialized, it begins transmitting one or more predetermined plurality of data to the test module 102 via interface 106. The predetermined plurality of data can be one or more packets of information or one or more time based frames of information. The detection module 112 provides an enable signal 116 in response to receiving one or more predetermined plurality of data via interface 106. In response to the enable signal 116, the capture module 114 begins to capture one or more predetermined plurality of data received via interface 106.

More specifically, the detection module 112 provides the enable signal 116 in response to receiving a predetermined number of predetermined plurality of data via interface 106. The predetermined number can be determined empirically and can vary depending on the type of DUT 100 being tested. In one embodiment, the predetermined number can be virtually any of a wide range of numbers of packets or frames, such as, for example, 8 packets or frames.

As such, the test module 102 begins testing the DUT 100 as soon as the DUT 100 has stabilized. Since the test module 102 does not have to wait for a predetermined time to begin testing, the test module 102 exhibits a reduced testing time, which can reduce production costs of the DUT 100.

The detection module 112 can include a counting module 118 and a comparison module 120. Although the counting module 118 and the comparison module 120 are components of the detection module 112 in this example, those of ordinary skill in the art will appreciate that the modules 118, 120 can be implemented as discrete components separate from the detection module 112 if desired.

The counting module 118 increments (or decrements) a count 122 in response to receiving one or more predetermined plurality of data from the DUT 100. The comparison module 120 compares the count 122 to a predetermined number 124, which can be stored in a memory module 126 such as memory (e.g., volatile or non-volatile), one or more registers, or other suitable storage means. As previously noted, the predetermined number 124 is often determined empirically and can vary depending on the type of DUT 100 being tested.

When the count 122 transcends (or in some cases equals) the predetermined number 124, the comparison module provides the enable signal 116 to the capture module 114. As noted above, the capture module 114 captures one or more predetermined plurality of data received from the DUT 100 in response to the enable signal 116.

The test module 102 can also include a measurement module 128 and/or a storage module 130. The measurement module 128 receives captured predetermined plurality of data 132 from the capture module 114 and provides measurement information 134 based thereon. In some embodiments, the measurement information 134 can include power level information, data rate information, transmission quality information, spectral mask information, or other suitable measurement information. In some embodiments, the storage module 130 stores the measurement information 134 received from the measurement module 128. In other embodiments, the storage module 130 can store the captured predetermined plurality of data 132 rather than (or in addition to) the measurement information 134. As such, in some embodiments, the measurement module 128 is optional. The information 132 and/or 134 stored in the storage module 130 can be subsequently retrieved and analyzed by the computer 104 via interface 110.

Figure 2:
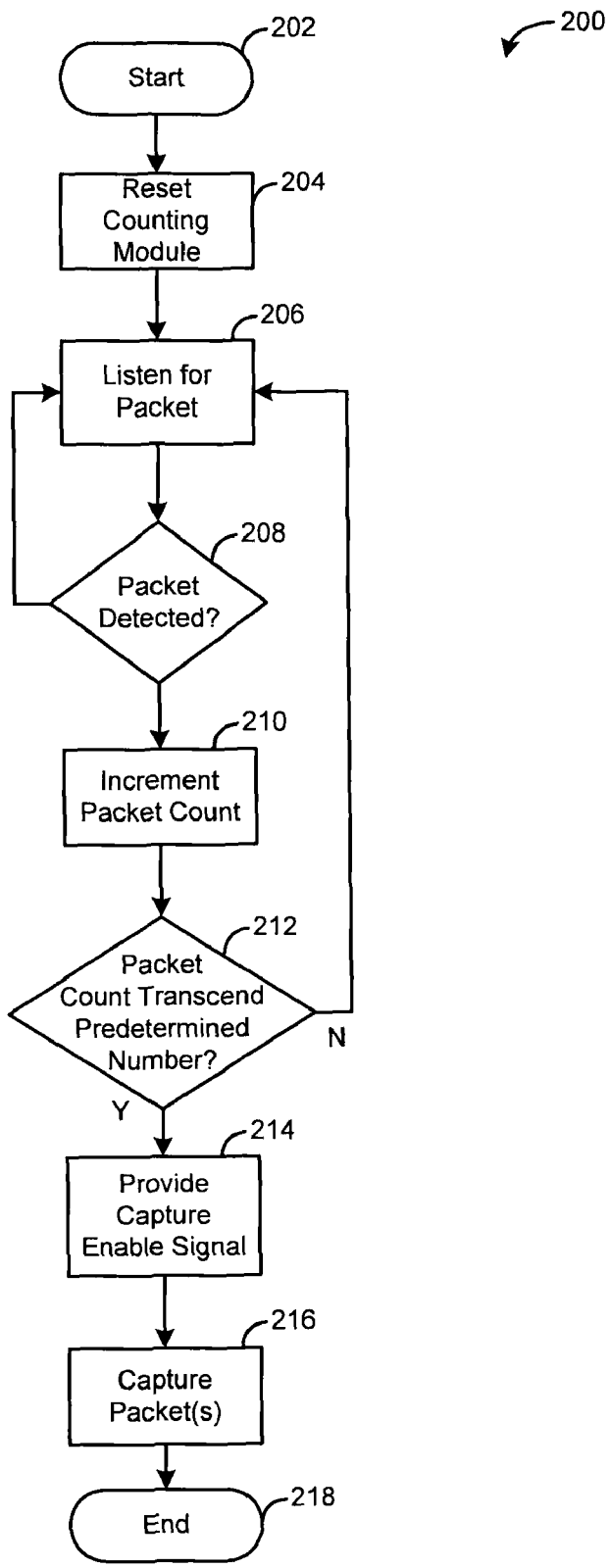
FIG. 2 is a flowchart depicting exemplary steps that can be taken by the test module.

Referring now to FIG. 2, exemplary steps that can be taken by the test module 102 are generally identified at 200. The process starts in step 202 when the DUT 100 is powered up and/or initialized. In step 204, the test module 102 resets the counting module 118 and any other counters, registers, or other suitable circuits. In step 206, the detection module 112 listens for one or more predetermined plurality of data to be received via interface 106.

In step 208, the detection module 112 determines whether a predetermined plurality of data has been received from the DUT 100. If a predetermined plurality of data has not been received, the process returns to step 206. However, if a predetermined plurality of data has been received the process proceeds to step 210. In step 210, the counting module 118 increments (or decrements) the count 122.

In step 212, the comparison circuit 120 determines whether the count 122 has transcended the predetermined number 124. If the count 122 has not transcended the predetermined number 124, the process returns to step 206. However, if the count 122 has transcended the predetermined number 124, the comparison module 120 provides the enable signal 116 in step 214. In step 216, the capture module 114 captures predetermined plurality of data received from the DUT 100 in response to the enable signal 116. The process ends in step 218.

Figure 3:
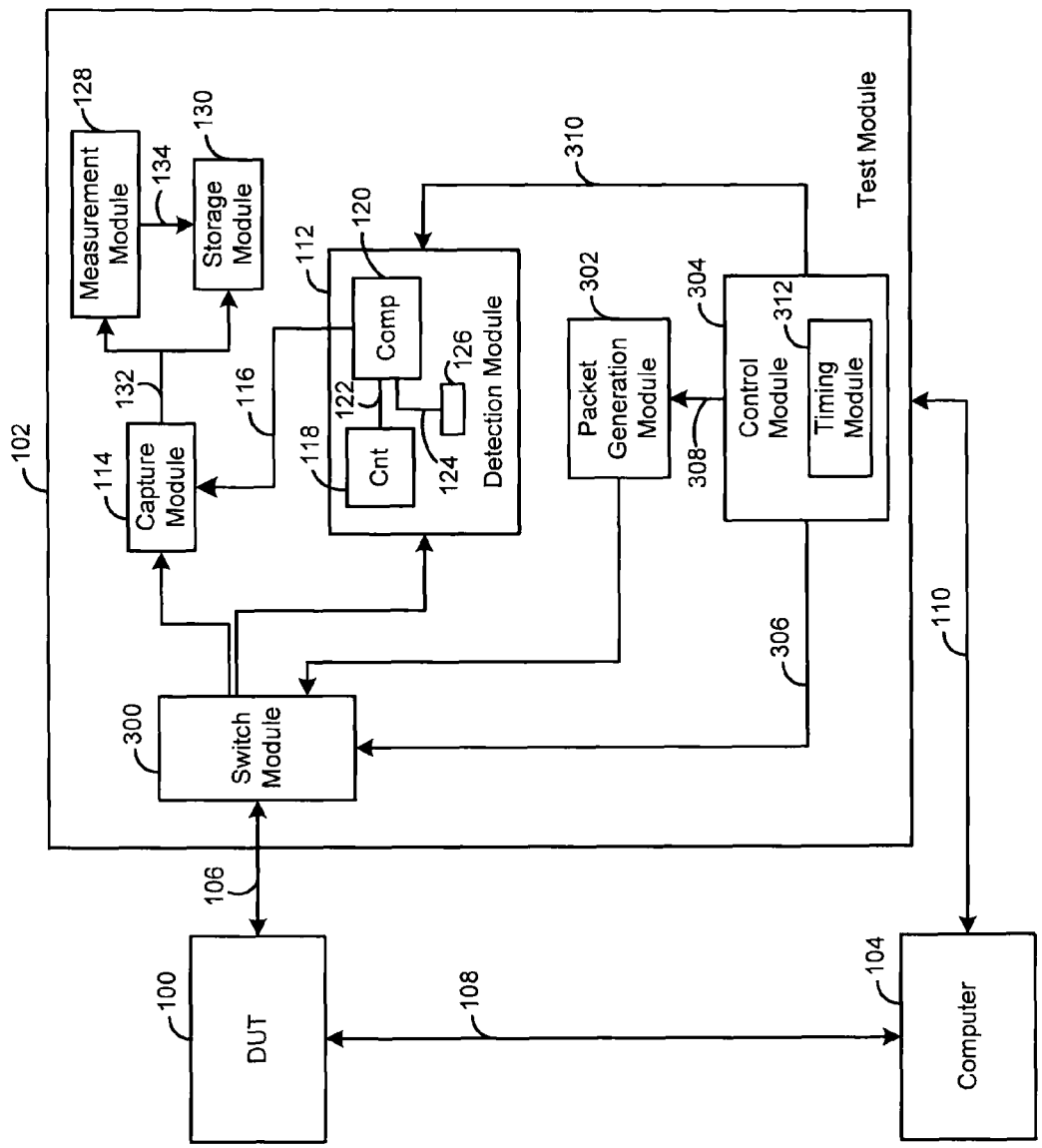
FIG. 3 is an exemplary functional block diagram depicting an alternate embodiment of the test module.

Referring now to FIG. 3, an exemplary functional block diagram of an alternative embodiment of the test module 102 is depicted. In this embodiment, the test module 102 determines whether the DUT 100 is synchronized to test module 102 prior to capturing predetermined plurality of data received from the DUT 100. In this example, the test module 102 also includes a switch module 300, a generation module 302, and a control module 304. The control module 304 provides a switch control signal 306, a generation enable signal 308, and a detection enable signal 310 based on timing information provided by an associated timing module 312.

The switch module 300 selectively communicates one or more predetermined plurality of data between the interface 106 and detection module 112, the capture module 114, and/or the generation module 302 in response to the switch control signal 306. In some embodiments, the switch control signal 306 controls the switch module 300 to either communicate predetermined plurality of data to the interface 106 or receive predetermined plurality of data from the interface 106 (e.g., transmit or receive predetermined plurality of data via the interface 106). In some embodiments, the switch module 300 can be replaced with a power combiner module (not shown) to allow for simultaneous communication between the interface 106 and detection module 112, the capture module 114, and/or the generation module 302.

When the DUT 100 is powered up and/or initialized, the generation module 302 transmits one or more predetermined plurality of data to the DUT 100, via the switch module 300 and interface 106, in response to the generation enable signal 308. Once the generation module 302 transmits one or more predetermined plurality of data, the detection module 112 is enabled via the detection enable signal 310. In response to the detection enable signal 310, the detection module 112 listens for one or more predetermined plurality of data to be received from the DUT 100, via the interface 106 and switch module 300. If the detection module 112 does not receive one or more predetermined plurality of data from the DUT 100, the generation module 302 is re-enabled via the generation enable signal 308 and transmits one or more additional predetermined plurality of data to the DUT 100. However, if the detection module 112 receives one or more predetermined plurality of data from the DUT 100, the DUT 100 is deemed to be synchronized and can be subsequently tested. In some embodiments, the DUT 100 is deemed to be synchronized when a predetermined number of predetermined plurality of data have been received. For example, the DUT 100 can be deemed to be synchronized when the detection module 112 receives three predetermined plurality of data. Although three predetermined plurality of data are used in this example, any other suitable predetermined number can be used.

When the DUT 100 is synchronized, the test module 102 can transmit one or more predetermined plurality of data to the DUT 100. In response to the one or more predetermined plurality of data, the DUT 100 transmits one or more predetermined plurality of data to the test module 102. The detection module 112 receives the predetermined plurality of data from the DUT 100 and increments (or decrements) the count 122. When the count 122 transcends the predetermined number 124, the comparison module 120 provides the enable signal 116. In response to the enable signal 116, the capture module 114 begins to capture one or more predetermined plurality of data received via interface 106.

In some embodiments, the measurement module 128 receives the captured predetermined plurality of data 132 from the capture module 114 and provides the measurement information 134 based thereon. The storage module 130 stores the measurement information 134 received from the measurement module 128. In other embodiments, the storage module 130 can store the captured predetermined plurality of data 132 rather than (or in addition to) the measurement information 134. The information 132 and/or 134 stored in the storage module 130 can be subsequently retrieved and analyzed by the computer 104 via interface 110.

Figure 4:
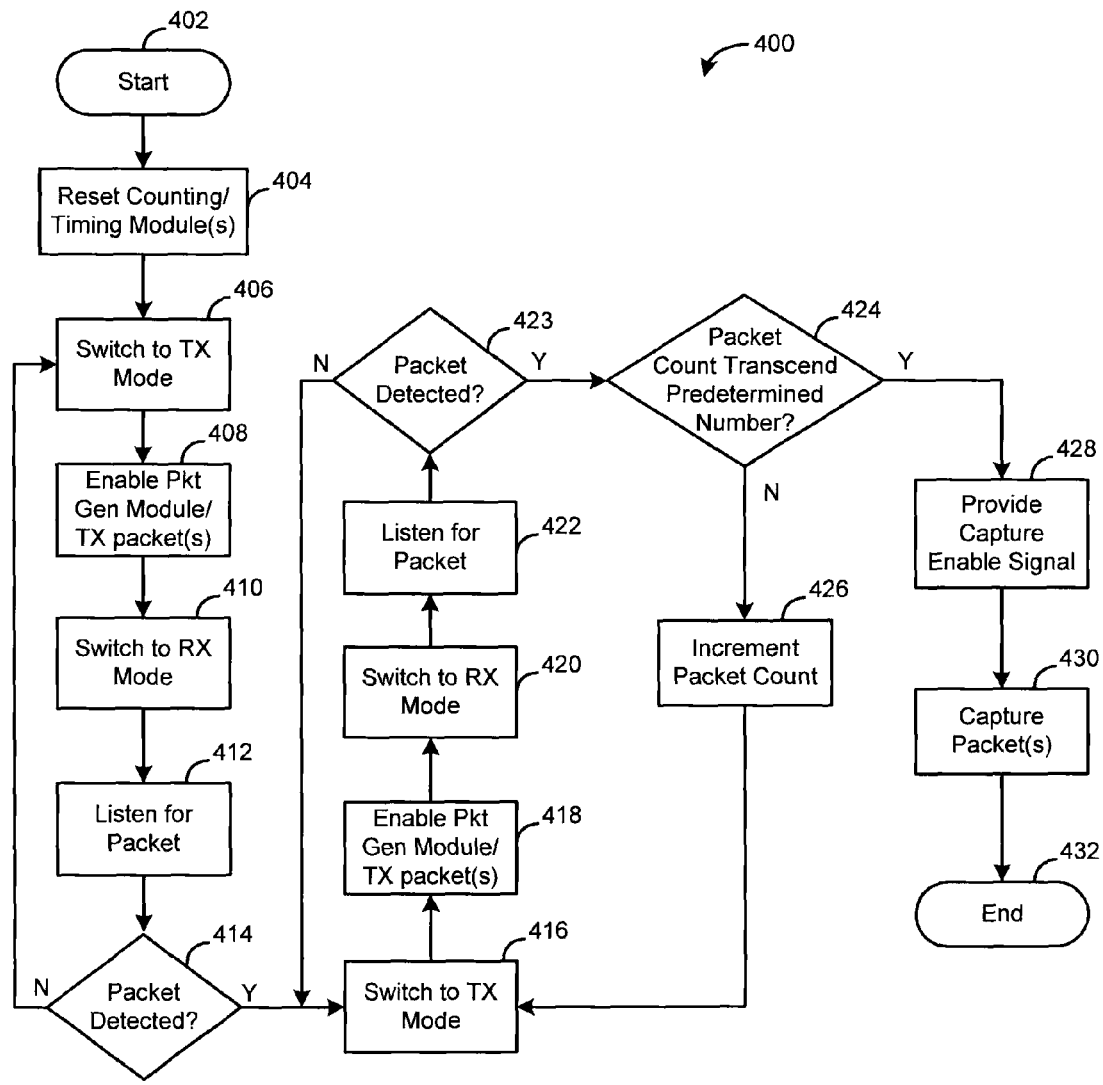
FIG. 4 is a flowchart depicting exemplary steps that can be taken by the alternate embodiment of the test module.

Referring now to FIG. 4, exemplary steps that can be taken by the test module 102 are generally identified at 400. The process starts in step 402 when the DUT 100 is powered up and/or initialized. In step 404, the counting module 118, the timing module 312, and/or other suitable circuits are reset. In step 406, the control module 304 provides the switch control signal 306 so that the generation module 302 can communicate with the interface 106. In step 408, the control module 304 provides the generation enable signal 308 and the generation module 302 transmits one or more predetermined plurality of data to the DUT 100 in response to the generation enable signal 308. In step 410, the control module 304 provides the switch control signal 306 so that the detection module 112 and/or the capture module 114 can receive predetermined plurality of data from interface 106. In step 412, the detection module 112 listens for one or more predetermined plurality of data to be received from the DUT 100.

In step 414, the detection module 112 determines whether one or more predetermined plurality of data have been received. In some embodiments, the one or more predetermined plurality of data can include information indicating whether the DUT 100 is synchronized. In other embodiments, the detection module 112 determines that the DUT 100 is synchronized by receiving the one or more predetermined plurality of data while detection module 112 is enabled via the control module 304. If the detection module 112 does not receive one or more predetermined plurality of data while it is enabled via the detection enable signal 308, the process returns to step 406. However, if detection module 112 does receive one or more predetermined plurality of data while it is enabled, the process proceeds to step 416.

In step 416, the control module 304 provides the switch control signal 306 so that the generation module 302 can transmit predetermined plurality of data to the DUT 100. In step 418, the control module 304 provides the generation enable signal 308 and the generation module 302 transmits one or more predetermined plurality of data to the DUT 100 in response to the generation enable signal. In step 420, the control module 304 provides the switch control signal 306 so that the detection module 112 and/or the capture module 114 can receive predetermined plurality of data from the DUT 100. In step 422, the control module 304 provides the detection enable signal 310 and the detection module 112 begins to listen for one or more predetermined plurality of data received from the DUT 100 in response to the detection enable signal 310. In step 423, the detection module 112 determines whether one or more predetermined plurality of data have been received from the DUT 100. If one or more predetermined plurality of data have not been received, the process returns to step 416. However, if one or more predetermined plurality of data have been received, the process proceeds to step 424.

In step 424, the comparison module 120 determines whether the count 122 has transcended the predetermined number 124. If the count 122 has not transcended the predetermined number 124, the counting module 118 increments (or decrements) the count 122 in step 426 and the process returns to step 416. However, if the count 122 has transcended the predetermined number 124, the detection module 112 provides the enable signal 116 in step 428. In step 430, the capture module 114 captures one or more predetermined plurality of data received from the DUT 100 in response to the enable signal 116. The process ends in step 432.

As noted above, among other advantages, the test module 102 does not have to wait for a worst case time delay before testing the DUT 100. As such, the testing module 102 exhibits a reduced testing time, which reduces production costs. In addition, the testing starts when the testing module 102 receives a predetermined number of predetermined plurality of data from the DUT 100. Therefore, the testing module 102 does not need to issue additional commands, which further reduces testing time. Other advantages will be recognized by those of ordinary skill in the art.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus for testing a communication circuit, comprising:
   a detection module that is operative to provide an enable signal in response to receiving at least one predetermined plurality of data having predetermined data content from a communication device under test;
   a capture module that is operative to capture at least one other predetermined plurality of data in response to the enable signal; and
   a measurement module that is operative to measure at least one of power and data rate of the at least one other predetermined plurality of data.

2. The apparatus of claim 1 wherein the detection module is operative to provide the enable signal in response to detecting a predetermined number of predetermined plurality of data.

3. The apparatus of claim 1 further comprising a storage module that is operative to store the at least one other predetermined plurality of data.

4. The apparatus of claim 1 wherein the detection module comprises a counting module that is operative to at least one of increment and decrement a count in response to each of the at least one predetermined plurality of data received.

5. The apparatus of claim 4 wherein the detection module further comprises a comparison module that is operative to provide the enable signal in response to the count transcending the predetermined number.

6. The apparatus of claim 1 further comprising a generation module that is operative to transmit a first predetermined plurality of data in response to a generation enable signal, wherein the at least one predetermined plurality of data is received in response to transmitting the first predetermined plurality of data.

7. The apparatus of claim 6 wherein the detection module is operative to receive the at least one predetermined plurality of data in response to a detection enable signal and a remote communication circuit is deemed synchronized when the at least one other predetermined plurality of data is received.

8. The apparatus of claim 6 further comprising a switch module that is operative to selectively communicate at least one of: the at least one predetermined plurality of data to the detection module; the at least one other predetermined plurality of data to the capture module; and the first predetermined plurality of data from the generation module in response to a switch control signal.

9. A method for testing a communication circuit, comprising:
   providing an enable signal in response to receiving at least one predetermined plurality of data having predetermined data content from a communication device under test;
   capturing at least one other predetermined plurality of data in response to the enable signal; and
   measuring at least one of power and data rate of the at least one other predetermined plurality of data.

10. The method of claim 9 further comprising providing the enable signal in response to detecting a predetermined number of predetermined plurality of data.

11. The method of claim 9 further comprising storing the at least one other predetermined plurality of data.

12. The method of claim 9 further comprising at least one of incrementing and decrementing a count in response to each of the at least one predetermined plurality of data received.

13. The method of claim 12 further comprising providing the enable signal in response to the count transcending the predetermined number.

14. The method of claim 9 further comprising transmitting a first predetermined plurality of data in response to a generation enable signal, wherein the at least one predetermined plurality of data is received in response transmitting the first predetermined plurality of data.

15. The method of claim 14 wherein the at least one predetermined plurality of data is received in response to a detection signal and a remote communication circuit is deemed synchronized in response to receiving the at least one other predetermined plurality of data.

16. An apparatus for testing a communication circuit, comprising:
   a detection module that is operative to detect a plurality of predetermined plurality of data having predetermined data content and to provide an enable signal in response to detecting a predetermined number of the plurality of predetermined plurality of data;
   a capture module that is operative to capture at least one of the plurality of predetermined plurality of data in response to the capture enable signal; and
   a measurement module that is operative to measure at least one of power and data rate of the at least one other predetermined plurality of data.

17. The apparatus of claim 16 wherein the detection module comprises:
   a counting module that is operative to at least one of increment and decrement a count in response to detecting each of the plurality of predetermined plurality of data; and
   a comparison module that is operative to provide the enable signal in response to the count transcending the predetermined number.

18. An apparatus for testing a communication circuit, comprising:
   a generation module that is operative to transmit at least one first predetermined plurality of data;
   a detection module that is operative to detect at least one second predetermined plurality of data having predetermined data content in response to the at least one first predetermined plurality of data and to provide an enable signal in response to detecting a predetermined number of the at least one second predetermined plurality of data;
   a capture module that is operative to capture a plurality of predetermined plurality of data in response to the enable signal; and
   a measurement module that is operative to measure at least one of power and data rate of the at least one other predetermined plurality of data.

* * * * *